Jan. 19, 1926.  1,569,927
J. H. HAMMOND, JR
SYSTEM OF AND MECHANISM FOR CONTROLLING MOVING BODIES BY RADIANT ENERGY
Original Filed Nov. 26, 1919  4 Sheets-Sheet 2
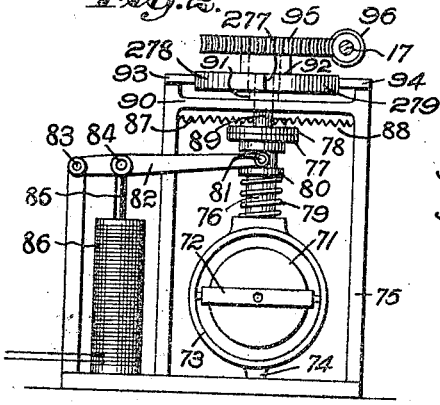
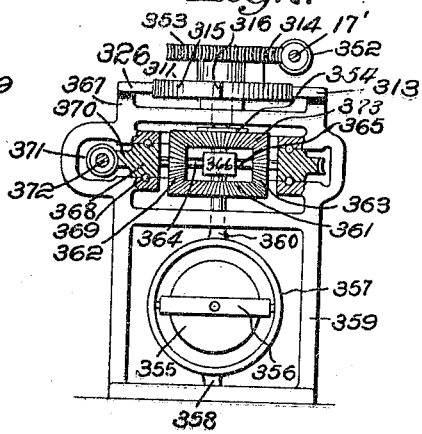
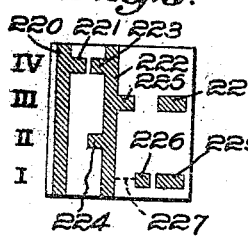
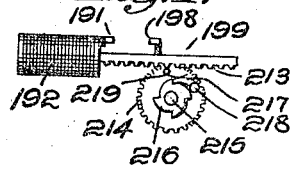
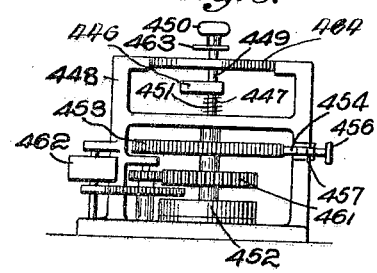
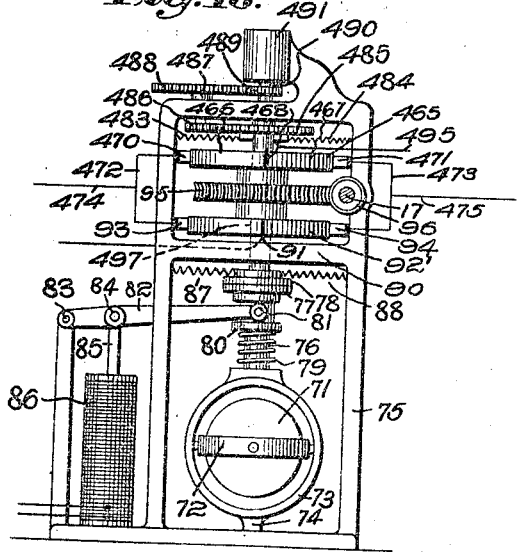
Inventor:
John Hays Hammond, Jr.
by Emery Booth, Janney and Varney
Attys

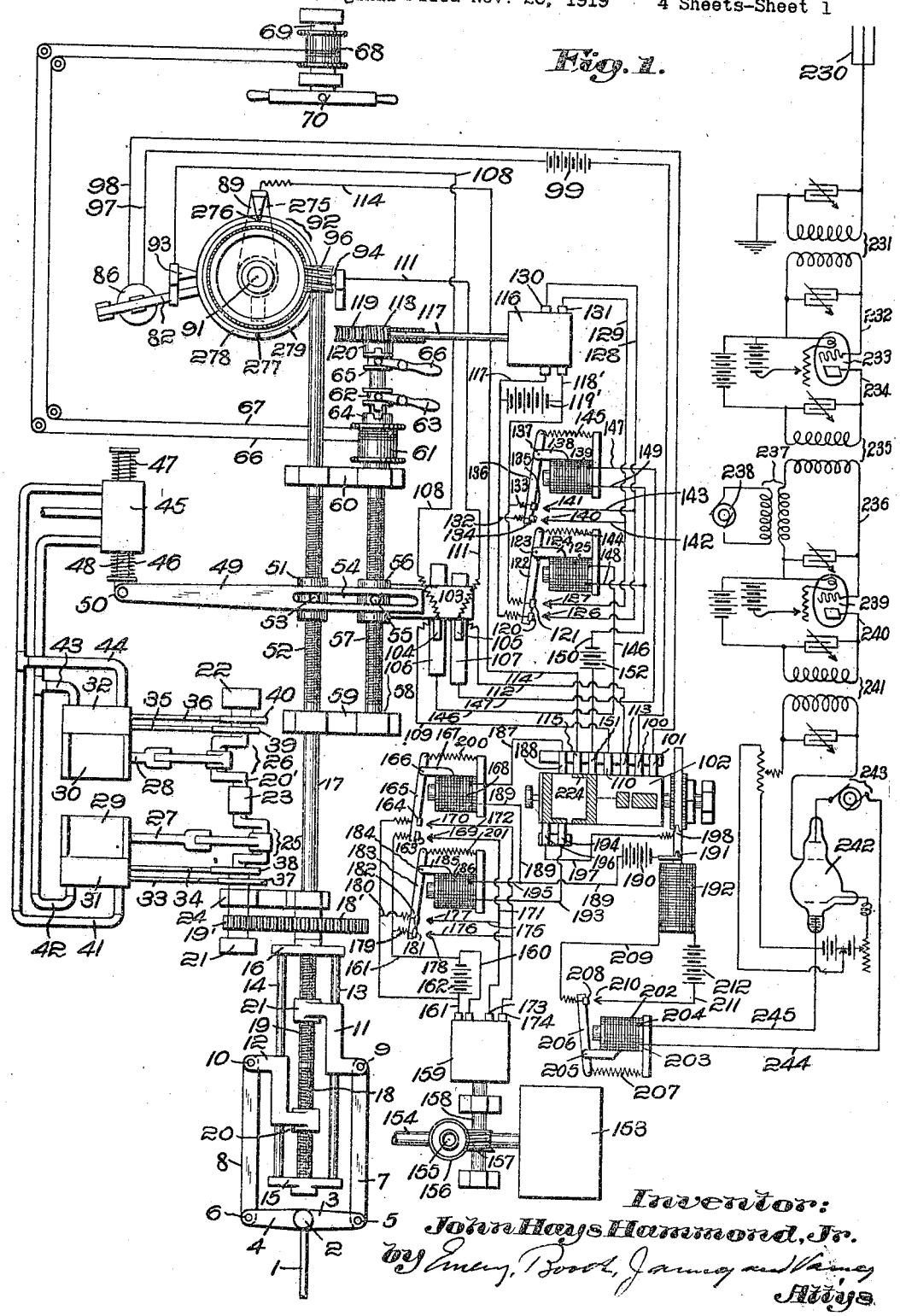

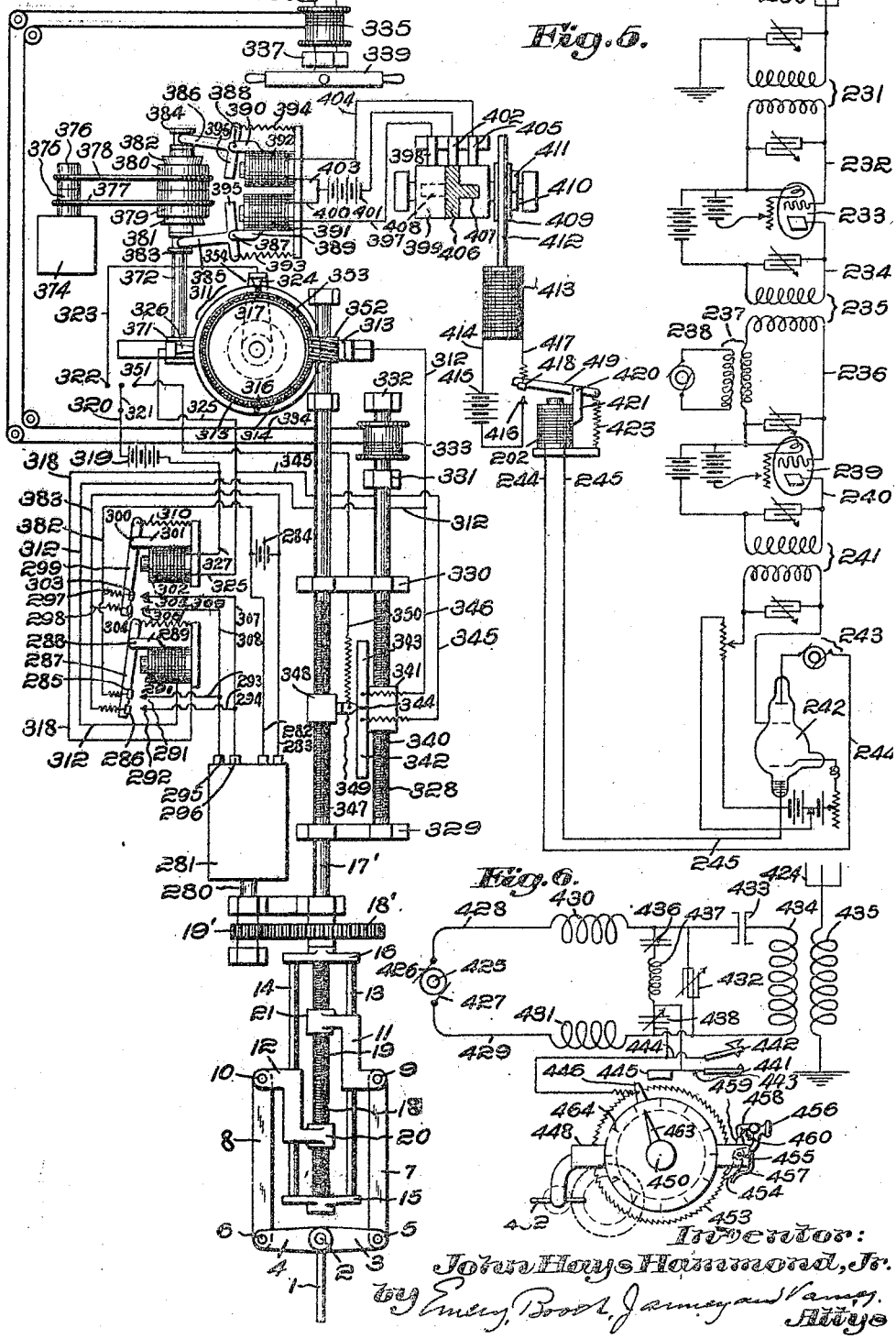

Patented Jan. 19, 1926.

1,569,927

UNITED STATES PATENT OFFICE.

JOHN HAYS HAMMOND, JR., OF GLOUCESTER, MASSACHUSETTS.

SYSTEM OF AND MECHANISM FOR CONTROLLING MOVING BODIES BY RADIANT ENERGY.

Application filed November 26, 1919, Serial No. 340,698. Renewed February 23, 1924.

*To all whom it may concern:*

Be it known that I, JOHN HAYS HAMMOND, Jr., a citizen of the United States, and a resident of Gloucester, in the county of Essex and State of Massachusetts, have invented an Improvement in Systems of and Mechanism for Controlling Moving Bodies by Radiant Energy, of which the following description, in connection with the accompanying drawings, is a specification, like characters on the drawings representing like parts.

This invention relates to systems of and to mechanism for controlling moving bodies at a distance by radiant energy and particularly for controlling vessels of large size, such, for example, as battle ships, cruisers, and the like.

In order that the principle of the invention may be readily understood, I have in the accompanying drawings shown certain embodiments of my invention.

In said drawings, —

Fig. 1 is a diagrammatic representation of a system embodying my invention and indicating one form of mechanism whereby in accordance with my invention a moving vessel of large type, such as a battle ship or cruiser may be guided;

Fig. 2 is a side elevation, somewhat diagrammatic, of parts of a gyroscope or like direction-maintaining means and clutch controlling means therefor;

Fig. 3 is a development of the commutator or like governing means whereby the functioning of the various parts of the system represented in Fig. 1 is controlled;

Fig. 4 is a side elevation of one form of means for imparting a step-by-step movement of rotation to the commutator;

Fig. 5 is a view similar to Fig. 1 of a second form of system and mechanism embodying my invention;

Fig. 6 is a diagrammatic representation of one form of transmitting system for radiant energy to be employed in the practice of my invention and with any of the systems herein shown;

Fig. 7 is a side elevation, somewhat diagrammatic, of parts of a gyroscope or like direction-maintaining means particularly adapted for use in connection with that form of system shown in Fig. 5;

Fig. 8 is a front elevation of a part of the mechanism employed with that type of transmitting system illustrated in Fig. 6;

Fig. 10 is a view similar to Fig. 2 but showing a form or type of mechanism particularly adapted to be used with that form or type of system shown in Fig. 9;

Fig. 11 is a development of that form of commutator preferably employed in the system shown in Fig. 9; and Fig. 12 is a side elevation similar to Fig. 4 of means for imparting a step-by-step movement of rotation to the commutator shown in that form of system represented in Fig. 9.

Figure 9:
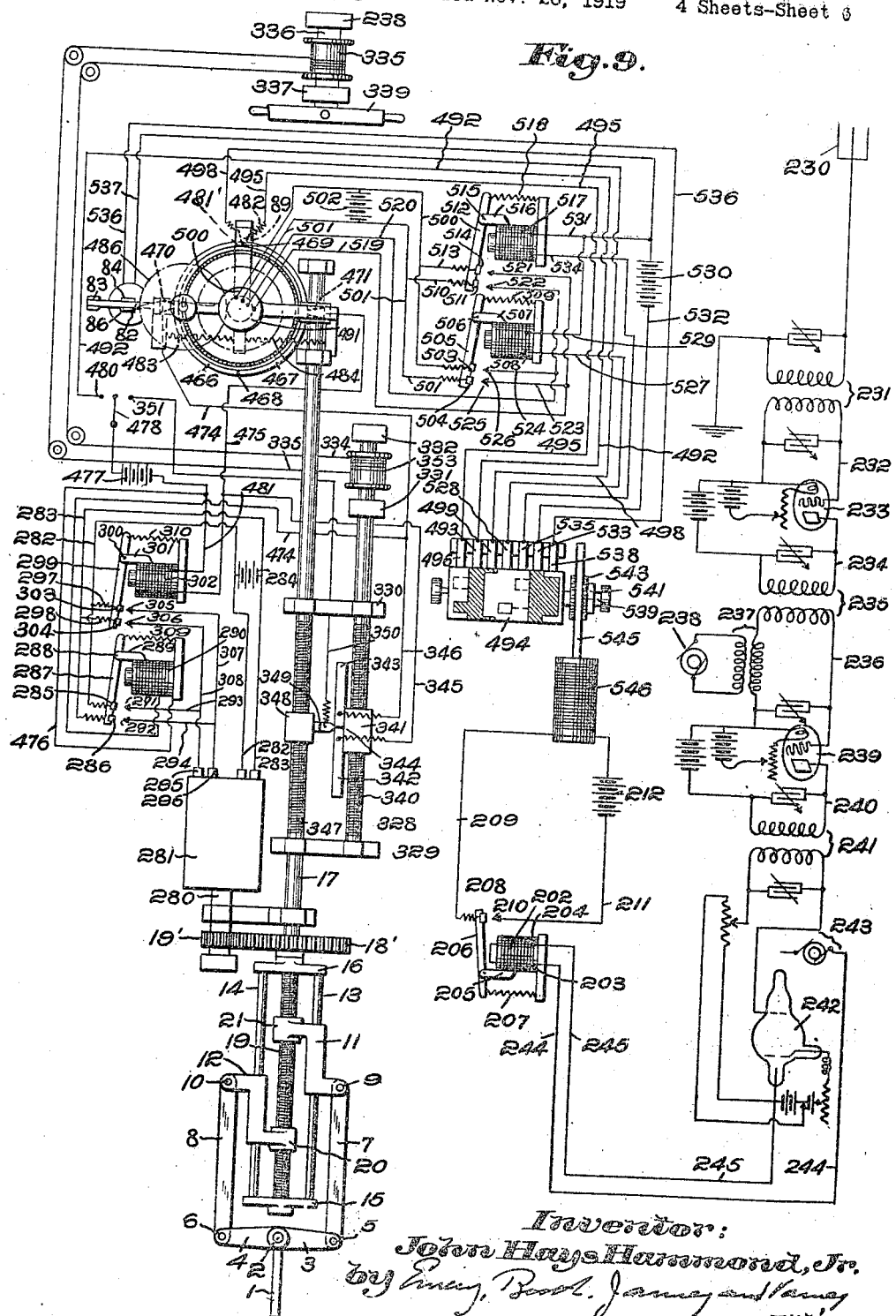
Fig. 9 is a view similar to Fig. 1 of still another form or type of system embodying my invention.

While my invention is not limited thereto, and particularly so far as certain aspects thereof are concerned, an important object of my invention is the control by radiant energy from a distance of large moving bodies. I have disclosed my invention with particular reference to the control of vessels of a large type such as for example as battle ships, cruisers and the like.

In vessels of large type, the rudder or steering means, of whatever form employed, is controlled by power means or mechanism, such, for example, as steam, electricity or compressed air. In the system represented in Fig. 1, I have indicated a rudder that is adapted to be controlled by power means including a steam engine and have represented my invention as adapted to control the rudder through the action of such steam engine and have also represented power means control of other parts of the vessel pertaining to the steering and the speed thereof.

In the practice of my invention I employ radiant energy transmitted from a suitable transmitting or controlling station that may be at any suitable distance from the vessel, as, for example, upon the shore or upon another vessel, or upon an aeroplane or other moving body. I have in Fig. 6 represented one form or type of system or means for transmitting radiant energy and to which I will hereinafter refer in more detail, and in Figs. 1, 5 and 9 I have represented one form of receiving mechanism or apparatus coacting therewith and through which the system and mechanism represented in Fig. 1, as well as those represented in Figs. 5 and 9 may be controlled. That form of receiving system shown in Fig. 1 is therein indicated merely for purposes of illustration, and I desire it to be understood that my invention is in no sense limited in its use or adaptation to such form of receiving system, nor is it limited to the form or type of transmitting system herein shown. The form or type of transmitting and receiving systems herein indicated are both of my invention and for a detailed and specific description thereof, reference is made to my co-pending application Serial No. 155,500, filed March 17, 1917. I will, however, in this application describe both the transmitting and the receiving systems with sufficient particularity to enable my invention to be understood. As already stated I have in Fig. 1 represented the rudder of a vessel of large type and have indicated steam engine means for turning the same. I have also indicated means whereby the valve mechanism of the steam engine may be controlled by a suitable steering means. My invention so far as that type shown in Fig. 1 is concerned includes suitable means governed, controlled or actuated through radiant energy whereby the rudder mechanism may be controlled through the steam engine means and parts to which I have referred.

In adapting my invention to that result and making particular reference to the system shown in Fig. 1, I have therein disclosed in sufficient detail the following organizations:

1. Power means—in this form of my invention a steam engine—whereby movement of rotation is imparted to a shaft, or a like or equivalent part is controlled, whereby the rudder is turned.

2. Valve means whereby the steam engine is controlled, that is, whereby it is started and stopped and also whereby the rotation thereof is controlled.

3. Motor means for driving a shaft or suitable part by which said valve means is controlled.

4. Reversing means for the motor means.

5. Means whereby a gyroscope or other direction-maintaining means may be permitted to function as by a governing clutch with a solenoid or other controlling means therefor;

6. Speed governing means controlled through the action of a suitable motor.

7. Such other parts as are necessary or desirable to give full control of the vessel to the means for transmitting radiant energy.

The several means above referred to and such others as may be necessary are, in accordance with my invention, under the control of suitable governing means, such as a commutator and one form of which is indicated in the development, Fig. 3. The said commutator is given a step-by-step movement through the receiving system indicated in Fig. 1.

For convenience and clearness of description, I will describe the structure or system shown in Fig. 1 commencing with the rudder of the vessel and thereafter will describe the several operative positions of the commutator shown in Fig. 1, which in the system represented in said figure are four in number, and will then set forth the functioning of such parts as operate in each of the said positions of the commutator, preferably commencing with one of the two positions that I designate as the normal or neutral positions of the commutator, namely, those wherein the gyroscope or other direction-maintaining means governs the steering of the vessel.

In Fig. 1, the rudder of the vessel is indicated at 1 as pivotally mounted upon the rudder post 2 and as having lever arms 3, 4 extending therefrom and pivotally connected at the ends 5, 6 thereof to links 7, 8 which at their opposite ends are pivotally connected at 9, 10 to members 11, 12 mounted for longitudinal movement upon guide rods 13, 14 here shown as extending through said members and as supported at their opposite ends in frames 15, 16 having suitable bearings for a longitudinally extending shaft 17 through the rotation of which in a manner to be hereinafter described the rudder 1 is turned. The said shaft 17 has oppositely threaded portions 18, 19 receiving nuts 20, 21 upon the members 12, 11. The construction and operation are such that through the rotation of the shaft 17 in one direction or the other as hereinafter described the nuts 20 and 21 are moved therealong toward or from each other so as to turn the rudder 1 to port or to starboard. In that form of mechanism shown in Fig. 1 and viewing the shaft 17 from above, if said shaft be turned in a clock-wise direction the rudder 1 is turned to starboard and if the shaft be turned in a contraclockwise direction the rudder is turned to port.

While any suitable means may be employed to rotate the shaft 17, I have herein represented it as having fast thereon a gear 18′ driven by a pinion 19′ meshing therewith and which is fast upon a crank or other suitable shaft 20′ mounted in suitable bearings 21′, 22, 23, 24. Said shaft 20′ is here shown as having suitable crank members 25, 26 for reciprocating the piston rods 27, 28 of the steam cylinders 29, 30 having valve boxes 31, 32, the valves whereof may be controlled in any suitable manner, as by links 33, 34, 35, 36 governed by eccentrics or like means 37, 38, 39, 40 upon the said shaft 20'. In this or in any other suitable manner the rotation of the shaft 20' is governed and the desired movements of rotation are imparted to the shaft 17 whereby the rudder 1 is turned to port or to starboard.

Steam is admitted to the steam valve boxes 31, 32 by means of suitable steam pipes 41, 42, 43, 44 extending from a suitable valve box or casing 45 containing any suitable valve mechanism or device. Herein I have merely diagrammatically indicated a type of balance valve normally maintained in balanced position by means of coiled springs 46, 47 mounted upon a rod 48 and suitably confined in position thereon.

Suitable means are provided to move the valve within the box or casing 45 through longitudinal movement of the rod 48. While for this purpose any suitable means may be provided I have herein represented a lever arm 49 pivoted at 50 to said rod 48 and mounted between its ends upon a nut 51 carried by a threaded portion 52 of said shaft 17. I have here shown the thread 52 as a right hand thread. The nut 51 is represented as provided with a pin or projection 53 taking into a longitudinal slot 54 in said lever arm 49. Preferably said slot 54 is sufficiently elongated to receive a pin 55 upon a nut 56 upon the threaded portion 57 of a shaft 58 here shown as positioned in parallelism with the shaft 17 and as mounted in suitable bearings in brackets 59, 60 also having suitable bearings for the shaft 17. The thread 57 upon the shaft 58 is herein represented as a right hand thread.

Means are provided to impart movements of rotation in either direction to the shaft 58 so as to move the valve in the valve box or casing 45 and thus govern the starting, stopping and movements of the steam engine.

While for this purpose any suitable means may be provided I have herein represented the said shaft 58 as having loosely mounted thereon a drum 61 adapted to be clutched to or otherwise made fast with the shaft as by means of a clutch member 62 which may be manually or otherwise controlled and as herein represented by a hand actuated lever 63. The clutch member 62 is adapted when moved to engage with a suitable clutch member 64 upon the drum 61. I have also represented a clutch member 65 to be more particularly referred to and herein shown as controlled by a hand actuated lever 66. Said clutch members 62, 65, which may be independent of each other or may be connected together, are adapted to slide longitudinally upon the shaft but are held from rotating loosely thereon by a key or spline or in any other suitable manner.

Extending from the drum 61 is a suitably guided cable 66, 67 extending to and about a suitable drum 68 positioned at any desired point upon the ship and here shown as fast upon a shaft 69 adapted to be turned in either direction by a hand steering wheel 70 of any suitable type.

Although I have described the foregoing parts with particularity, I desire it to be understood that any other suitable means may be provided and that the rudder 1 may be turned through any suitable power means, one type thereof only being shown in Fig. 1.

I may provide any suitable direction-maintaining means whereby the vessel is maintained upon a fixed course, that is, at those times when the vessel is not under the control of radiant energy from the transmitting station. In the present embodiment of my invention, I have indicated a gyroscope as a suitable direction-maintaining means. In Fig. 2, I have indicated the gyroscope generally at 71 as mounted in suitable gimbal rings 72, 73, the gyroscope being driven by any suitable means not herein necessary to disclose or to refer to in detail. The outer gimbal ring 73 is provided with a suitable bearing 74 received in the framing 75 positioned at any suitable part of the vessel. From the said gimbal ring 73 extends upwardly a shaft 76 having thereon a clutch member 77 mounted for longitudinal movement upon said shaft but suitably held against rotation relative to said shaft. The said clutch member 77 is normally held in clutching relation with a coacting clutch member 78 by means of a suitable spring 79 coiled about said shaft and positioned between the gimbal ring 73 and an annularly grooved member 80 receiving the suitable pins or projections 81 upon a lever arm 82 pivoted at 83 upon the framing 75 and having pivotally connected thereto at 84 the core 85 of the solenoid 86 to be hereinafter more fully referred to.

The clutch members 77, 78 have any suitable coacting faces. The clutch member 78 is loosely mounted upon an extension of the shaft 76 which at its upper end is received in a suitable bearing in the frame 75. I provide suitable means whereby when the clutch member 78 is released from the clutch member 77, it is brought back to central position. For this purpose I have herein represented springs 87, 88 connected thereto and to the frame 75. Forming a part of or suitably connected to the clutch member 78 is the arm 89 shown most clearly in full and in dotted lines in Fig. 1 and in part in Fig. 2. The said arm, when the clutch members 77, 78 are engaged, forms a part of the gyroscope so as to function in a manner that need not be described in detail.

The frame 75 is provided with a cross member 90 from which upwardly extends a stud or support 91 indicated in dotted lines and whereon is mounted for rotation an azimuth ring 92 with which cooperate suitable brushes or contact members 93, 94. Connected with or forming a part of the azimuth ring 92 is a worm wheel 95 with which meshes a left hand worm 96 fast upon the shaft 17.

From the solenoid 86 extend the conductors 97, 98 of a circuit having therein a battery or other source of energy 99 and leading back to the brushes 100, 101 cooperating with the commutator 102 as hereinafter more fully described.

I have stated that any suitable means may be provided to move the valve in the valve box 45 so as to stop, start and control the movements of the steam engine through which the shaft 17 is rotated in either direction to turn the rudder to starboard or to port. For the purpose I have as stated represented the lever 49 moved by the nuts 51, 56 upon the shafts 17, 58. In accordance with my invention, I provide means coacting with said lever 49 whereby certain circuits, hereinafter more particularly referred to, are broken or dis-established at the proper time. Herein I have represented the nut 56 as having an extension 103 whereon are mounted brushes 104, 105 suitably insulated from said extension. Said brushes are adapted, in the longitudinal movement of the nut 56 in either direction, to ride along the contact segments 106, 107 herein shown as longitudinally displaced with respect to each other, so that when the nut 56 has reached the end of its downward movement, viewing Fig. 1, contact is automatically broken between the brush 104 and the segment 106 and whereby when the said nut 56 has reached the limit of its upward movement, viewing Fig. 1, contact is automatically broken between the brush 105 and the segment 107. By this or any other suitable means the circuits wherein are located the segments 106, 107 are broken.

The brush 104 has connected thereto a conductor 108 leading to the brush or contact member 93 which as stated makes contact with the azimuth ring 92. Also leading from said brush 104 is a conductor 109 leading to a brush 110 at the commutator 102. Connected with the brush 105 is a conductor 111 leading to the contact member or brush 94 which as stated makes contact with the azimuth ring 92 and from said brush 105 extends the conductor 112 leading to the brush 113 at the commutator 102. When the gyroscope is functioning in the control of the vessel, as will be more particularly described hereinafter, circuits are established at the proper time through said contact members 93, 94, 89. Leading from the arm 89 is a conductor 114 extending to the brush 115 at the commutator 102.

In accordance with my invention I provide suitable means under the control of radiant energy for rotating the shaft 58. While for this purpose any suitable means may be provided, I have herein indicated an electric motor 116 adapted to drive a shaft 117 here shown as provided with a worm 118 meshing with and driving a worm wheel 119 normally loose upon the shaft 58 but having a clutch member 120 whereby it may be clutched to said shaft through the instrumentality of the clutch member 65. The motor 116 is adapted to be driven in either direction and to be controlled through radiant energy in accordance with my invention and in this form of my invention from the commutator 102.

While any suitable means may be provided to reverse the direction of rotation of the electric motor 116 I have here shown the following means. Extending from the field connections of said motor are the conductors 117′, 118′, and the battery 119′ extends across the field thereof. The conductors 117′, 118′ lead to terminals 120, 121 mounted upon a lever 122 pivoted at 123 upon a bracket 124 of the contactor magnet 125. When the said contactor magnet is energized the lever arm 122 acting as an armature magnet is energized the lever arm 122 acting as an armature brings the terminals 120, 121 into contact with the terminals 126, 127 of the conductors 128, 129 leading to the armature connections 130, 131 respectively of the electric motor 116. Leading from the conductors 117′, 118′ are wires 132, 133 extending to terminals 134, 135 upon a lever or armature 136 pivoted at 137 upon a bracket 138 upon the contactor magnet 139. When said magnet is energized the armature or lever 136 is moved downwardly carrying the terminals 134, 135 into contact with the terminals 140, 141 of the conductors 142, 143, the former being connected to wire 129 and the latter being connected to wire 128. When the contactor magnets 125, 139 are respectively de-energized the armature levers 122, 136 are lifted or moved into the position shown by the action of the springs 144, 145. Leading from the contact segment 106 is a conductor 146 leading to the contactor magnet 125 and leading from the contact segment 107 is a conductor 147 leading to contactor magnet 139. Leading from the contactor magnet 125 is a conductor 148 and leading from the contactor magnet 139 is a wire 149 connected to the common wire 150 extending to the brush 151 at the commutator 102. A battery 152 is located in the circuit having the conductor 150, etc.

Preferably I provide means whereby the speed of the vessel may be varied and control such means through radiant energy and in the form of my invention disclosed in Fig. 1, from the commutator 102. For that purpose I have herein represented a turbine engine 153. Leading to said turbine engine is a steam pipe 154 having a suitable valve 155. Said valve is adapted to be turned to open or close the same more or less by means of a worm wheel 156 suitably connected thereto and driven by suitable worm 157 upon the shaft 158 of a suitable motor such as an electric motor 159. I provide as stated any suitable means to drive this motor in either direction. For this purpose I have herein represented the following means. Extending from the field connections of said motor are the conductors 160, 161 and the battery 162 extends across the field thereof. The conductors 160, 161 lead to the terminals 163, 164 mounted upon a lever 165 pivoted at 166 upon a bracket 167 of the contactor magnet 168. When the said contactor magnet is energized, the lever arm 165 acting as an armature brings the terminals 163, 164 into contact with the terminals 169, 170 of the conductors 171, 172 leading to the armature connections 173, 174 respectively of the electric motor 159. Leading from the conductors 171, 172 are wires 175, 176 extending to the terminals 177, 178, and leading from the conductors 160, 161 are wires 179, 180 leading to terminals 181, 182 upon the armature lever 183 that is pivoted at 184 upon the bracket 185 of the contactor magnet 186. Leading from the contactor magnet 168 is the conductor 187 leading to the brush 188 at the commutator 102. Also leading from the contactor magnet 168 is the conductor 189 leading through a battery 190 to a contact point 191 mounted upon the solenoid 192. Leading from the contactor magnet 186 is a conductor 193 leading to the brush 194 at the commutator 102 and a conductor 195 also leads from said contactor magnet to the conductor 189. At the commutator 102 is located a brush 196 and leading therefrom is a conductor 197 extending to a contact point 198 shown most clearly in Fig. 4 as mounted upon the core 199 of the solenoid 192. The construction and arrangement are such that when the solenoid 192 is energized as hereinafter described the contact points 191, 198 are brought together and a circuit is completed through the conductors 189, 197.

The contactor magnets 168, 186 when energized act respectively to drive the electric motor 159 in opposite directions and thereby respectively to open and close the valve 155 either fully or to the desired extent.

When the armature levers 165, 183 are de-energized, they are moved into the position shown by springs 200, 201.

In order to move or turn the commutator 102 in a step-by-step manner, any suitable means may be provided under the control of the receiving system. For that purpose I have herein represented a relay magnet 202 having terminals 203, 204 extending to the receiving system as hereinafter more fully described. Upon a bracket 205 of said relay magnet is pivotally mounted an armature lever 206 adapted when de-energized to be moved into the position shown by a coil spring 207. Carried by said armature lever 206 is a terminal 208 from which extends a conductor 209 leading to the solenoid 192. When the relay magnet 202 is energized the armature lever 206 is moved so as to bring the terminal 208 into contact with the terminal 210 of the conductor 211 leading through the battery 212 to the solenoid 192. In this or in any other suitable way the relay magnet 202 when energized causes a longitudinal movement of the core 199 of the solenoid 192. Upon the core 199 of the solenoid are provided teeth 213 meshing with teeth upon a pinion 214 loosely mounted upon the shaft 215 of the commutator 102. In order to communicate movement from the core 199 to the shaft 215, I have herein represented the latter as having fast thereon a ratchet 216 with the teeth of which cooperate a pawl 217 pivoted at 218 upon the gear 214. The pawl 217 is held in proper relation with the teeth of the ratchet by its spring 219. The construction and relation of parts are such that upon movement of the core 199 to the left viewing Fig. 4, that is, upon energization of the solenoid 192, the commutator 102 is turned one step. The number of teeth upon the ratchet 215 conform to the number of positions of the commutator which in that form of my invention shown in Fig. 1 are four.

The commutator 102, a development of which appears in Fig. 3, is provided with a conducting strip, piece or segment 220 having a lateral extension 221 and also with a conducting strip 222 having three lateral extensions 223, 224, 225. The commutator is also provided with a contact piece 226 connected to the conducting strip 222 by means of a conductor 227 which is below the insulating surface of the commutator. The commutator is also provided with contact pieces 228 and 229 at suitable parts of the surface. Obviously the arrangement of conducting pieces or strips upon the commutator are merely such as to establish the proper circuits at the proper times and may be widely varied within the scope and purpose of my invention. As already stated, the commutator 102 has four positions and these are indicated at I, II, III, IV in Fig. 3.

I have already stated that any suitable receiving system may be provided whereby through the transmission of radiant energy the relay magnet 202 is energized. I will now describe briefly that form of receiving system shown in Fig. 1 and which may be and preferably is the same as that disclosed in my said co-pending application Serial No. 155,500.

I provide a suitable antenna 230 to receive the incoming waves and which are transferred by induction at the receiving transformer 231 to the grid circuit 232 of the detector or vacuum tube 233 causing pulsations of the proper frequency in the plate circuit 234. The said pulsations act inductively through the transformer 235 upon the selector circuit 236, to which is inductively coupled at 237 the circuit including the alternator 238. When a signal is not being sent from the transmitting station, to be hereinafter described, the pulsations received in the selector 236 are of the same frequency as those generated by the alternator 228 with the result that no beats are produced in the selector circuit 236. When a signal is sent the pulsations received in the selector circuit 226 vary by a given amount from those generated by the alternator 238 with the result that beats are set up in the selector circuit 236. These beats are impressed on the grid of the vacuum tube 239 and produce in the plate circuit 240 a corresponding number of pulsations which react inductively through the transformer 241 on the mercury tube 242 so as to trigger it off in a well known manner and not herein necessary more fully to describe, and thus allows energy to pass from the generator 243 through the two conductors 244, 245 leading to the terminals 203, 204.

I will now describe the operation of the system represented in Fig. 1 and wherein the commutator 102 is represented as at position No. II, which is what I term a normal position, namely, a neutral position of the commutator and one wherein the gyroscope 71 controls the vessel.

So long as the gyroscope controls the vessel and the latter remains upon its course, the terminal 275 remains upon the insulation 276 of the azimuth ring 92, said ring also having an insulation 277 separating the contact portions 278 and 279 of the azimuth ring 92.

While the gyroscope 71 controls the vessel, the clutch members 77, 78 are in cooperative engagement, the gyroscope solenoid 86 remaining de-energized. This condition is evident from Fig. 1 wherein the brushes 100 and 101 are not in contact with a contact strip or piece upon the commutator.

The terminals 93 and 94 remain in contact at all times with the contact strips or segments 278, 279 of the azimuth ring 92 which is moved in one direction or the other, as will be more fully described hereinafter.

We will now assume that the vessel is thrown off its course by waves, wind or tide or other natural agency to starboard. The arm 89 of the gyroscope, which remains fixed in space, is therefore moved relatively to the vessel in a contraclockwise direction viewing Fig. 1, so that the terminal 275 moves off the insulation 276 onto the contact segment 278. This completes a circuit through the terminal 93, the conductor 108, the brush 104, contact segment 106, conductor 146, through the contactor magnet 125, thence through the conductor 148, common 150 and battery 152 to the brush 151 at the commutator. The brush 115 is at this time in contact with the contact strip 224 and hence establishes a circuit through the brush 115, and the conductor 114 back to the terminal 275, thus completing the circuit.

This results in the energization of the contactor magnet 125, thereby closing the armature 122 with the result that the motor 116 is rotated in such a direction as to turn the shaft 58 in a contraclockwise direction viewed from the upper end in Fig. 1.

The result of rotating the shaft 58 in the described contraclockwise direction is to move the nut 56 toward the bottom of the sheet viewing Fig. 1 and so as to rock the lever 49 upon the pin 53 as a fulcrum and thereby to open the valve in the valve box 45 in such manner that steam is admitted into the cylinders 29 and 30 of the steam engine, so as to rotate the shaft 17 in a contraclockwise direction viewing Fig. 1 from the upper end. The rotation of the shaft 17 turns the rudder 1 to port.

In the practice of my invention I preferably provide what I broadly term helm angle limiting means, the function of which is to prevent full or unlimited movement of the rudder and to confine the same to relatively small limits. If the rudder were permitted to swing fully in either direction the vessel would overrun its course and in being brought back onto its course would overrun in the opposite direction, with the result that the vessel would pursue a zigzag or sinuous course.

The helm angle limiting means employed by me may be of any suitable type. For the purpose I have provided means already described for imparting movement to the azimuth ring 92 so that the same is moved in the same direction that the gyroscope arm 89 moves with relation to the vessel, with the result that the insulation 276 upon the azimuth ring overtakes the gyroscope arm 89 and breaks the circuit through the contactor magnet 125 and stops the motor 116. Such movement of the azimuth ring 92 is caused through the contraclockwise rotation of the shaft 17, the worm 96 upon said shaft driving the worm wheel 95 upon the azimuth ring 92 in the described direction.

The rotation of the shaft 17 is a contraclockwise direction as described moves the nut 51 towards the bottom of the sheet, viewing Fig. 1, so as to turn the lever contraclockwise about the pin 55, and thereby bring the valve in the valve box 45 into such position as to cut off the supply of steam to the steam cylinders 29, 30, thus stopping the rotation of the shaft 17 and the motion of the rudder 1, which is thereon held in a fixed position. The angle which the rudder 1 makes with the centre line of the ship is proportional to the amount which the ship has deviated from the course laid out by the gyroscope 71.

The rudder 1 having been moved as described to port results in the turning of the vessel to port, so that the gyroscope arm 89 moves with respect to the boat in a clockwise direction viewing Fig. 1. This results in the terminal 275 being moved off the insulation 276 onto the contact segment 279 with the result that a circuit is established through the contactor magnet 139, whereby the motor 116 is rotated in the opposite direction from that previously described, and the shaft 58 is now rotated in a clockwise direction viewing Fig. 1 from the upper end of the sheet containing said figure. Consequently the nut 56 is moved upward viewing Fig. 1 and the lever 49 is moved upon the pin 53 as a pivot so as to move the valve in the valve box 45 in such direction as to admit steam to the steam cylinders 29, 30 in such manner as to rotate the shaft 17 in a clockwise direction. The result of this is to turn the rudder 1 in a contraclockwise direction, that is, to turn it from its previously described position at port back toward the centre line of the vessel.

Consequent upon the rotation of the shaft 17 in a clockwise direction the azimuth ring 92 is moved in a clockwise direction viewing Fig. 1 so that the insulation 276 follows the movement of the gyroscope arm 89 with relation to the vessel until the said insulation 276 overtakes the terminal 275 and the circuit is broken through the contactor magnet 139 and the rotation of the motor 116 is stopped. The movement of the nut 56 consequent upon the described rotation of the shaft 58 is accompanied by the movement of the nut 51 consequent upon the rotation of the shaft 17, and when the rotation of the shaft 58 has been stopped as just described, the nut 51 has been brought into such position that it moves the lever 49 in the proper direction so as to move the valve in the valve box 45 to cut off the flow of steam to the steam cylinders 29, 30 and thus stop the rotation of the shaft 17. This holds the rudder 1 in a fixed position.

The described movements of the rudder continue until the vessel is brought back gradually onto the course set by the gyroscope. In the event that some agency such as referred to moves the vessel off its course to port, a corresponding action occurs and returns it to the proper course.

We will now assume that an impulse is received through the receiving system so as to energize the relay magnet 202. The effect of this is through the described means to turn the commutator 102 from the position shown—namely, position No. II—into position No. III.

In the position No. III the contact strip 228 bridges the gap between the brushes 100 and 101, thus closing the circuit including the conductors 97, 98 so as to energize the solenoid 86 and unclutch the clutch members 77, 78 with the result that the vessel is no longer under the control of the gyroscope 71.

As soon as the clutch member 78 has been released from engagement with the member 77, it is returned together with the arm 89 to a central position by means of the springs 87, 88 and is held in that position until it is again reclutched by the receiving of another impulse as will be described hereinafter.

The movement of the commutator 102 into said third position removes the contact strip 224 from the brush 115, so as to break the circuit established through said brushes 115 and 151 and through the conductors 114, 108, 111. This breaks the gyroscope-controlled circuit. This circuit remains broken so long as the gyroscope is not controlling the vessel.

The described movement of the commutator 102 into the said third position moves the contact strip 225 into engagement with the brush 110 so as to establish a circuit through said brush 110 and the brush 151 so as to energize the contactor magnet 125. The result of this is to rotate the motor 116 in such manner as to rotate the shaft 58 in a contraclockwise direction as viewed from the top of the sheet viewing Fig. 1, and in a manner already described. The result of the described rotation of the shaft 58 is to move the nut 56 downward, viewing Fig. 1, and therefore to move the lever 49 upon the pin 53 as a pivot in such direction as to cause steam to be admitted past the valve in the valve box 45 to the steam cylinder 29, 30 and hence to rotate the shaft 17 in a contraclockwise direction and therefore to move the rudder 1 to port. It will be understood that the described movement of the rudder 1 to port is effected through the energization of the relay magnet 202 from the receiving system.

The nut 56 moves downward as described viewing Fig. 1 until the brush 104 moves off the segment 106. This breaks the circuit through the contactor magnet 125 stopping the motor 116 and hence stopping the rotation of the shaft 58. The nut 56 having now moved to or nearly to its extreme downward position, the rudder 1 is now fully to port, the nut 51 having been moved by the rotation of the shaft 17 at the same time to such position that the valve in the valve box 45 is now in a neutral position and steam is cut off from the steam cylinders 29, 30, thus stopping the rotation of the shaft 17. The rudder being now fully to port, the vessel turns to port and this turning movement continues until another impulse is sent and received by the receiving system and through the energization of the relay magnet 202 moves the commutator 102 to its next position, namely, to position No. IV.

The movement of the commutator 102 into position No. IV breaks the circuit which has been established through the brushes 100, 101, so as to de-energize the solenoid 86 and permit the spring 79 to bring the clutch members 77, 78 into cooperative relation, thereby placing the vessel under the control of the gyroscope as previously described with respect to position No. II. The movement of the commutator 102 into the said fourth position results in the establishment of a circuit through the brushes 115 and 151 and the conductors 114, 111, 108, constituting the gyroscope-controlled circuit.

The vessel being now under the control of the gyroscope 71, the action as described with respect to position No. II of the commutator 102 again occurs and need not be more particularly described at this point.

The vessel continues under the control of the gyroscope 71 until another impulse is received and through the energization of the relay magnet 202, the commutator 102 is turned into its next position,—namely, into position No. I. The result of bringing the commutator into position No. I is to energize the solenoid 86, thereby disengaging the gyroscope clutch 77, 78. The gyroscope-controlled circuit is broken in the manner previously described with respect to position No. III, and the contact strip 226 bridges the gap between the brush 113 and the brush 151, thus closing the circuit through the conductor 112, brush 105, contact segment 107 and conductor 147, thereby energizing the contactor magnet 139 and rotating the motor 116 in such direction as to rotate the shaft 58 in a clockwise direction. This moves the nut 56 upward and hence swings the lever 49 contraclockwise and thereby through movement of the valve in the valve box 45 admits steam through the cylinders 29, 30 so as to rotate the shaft 17 in a clockwise direction, and thereby turn the rudder 1 to starboard. This movement of the nut 56 continues until the brush 105 is moved out of contact with the segment 107 thereby de-energizing the contactor magnet 139, thus stopping the rotation of the electric motor 116. This leaves the rudder 1 in starboard position, as previously described. This position of the rudder is maintained until another impulse is received turning the commutator to the next position, namely, position No. II. This completes a cycle of the operation.

In turning the commutator 102 into either neutral position—that is, into either position No. II or position No. IV, viewing Fig. 3, if the impulse be prolonged, the result is to close the circuit through the contacts 191, 198, Figs. 1 and 4, the conductor 197, the brush 196, the brush 194, the conductor 193, the conductor 195 through battery 190 and contact 191, thus energizing the contactor magnet 186. This effects the closing of the circuit through the conductors 160, 161, so as to drive the motor 159 and thereby rotate the valve 155 in one direction, as, for example, in a direction tending to close the same more or less and thus reduce the speed of the turbine 153 and consequently that of the vessel.

If a prolonged impulse be sent as the commutator 102 is turned into the other neutral position, that is, in position No. IV, viewing Fig. 3, the result is to close the circuit through the brush 188, conductor 187, conductor 189, battery 190, contacts 191, 198, conductor 197, brush 196, and contact strips 220, 221 upon the commutator, thereby energizing contactor magnet 168 and rotating the motor 159 in the opposite direction. This results in turning the valve 155 in the opposite direction, that is, in the direction tending to open the valve more or less, and thereby to increase the speed of the turturbine 153 and consequently of the vessel.

If it be desired to steer the vessel manually instead of through impulses received from the transmission station, and referring to the disclosed embodiment of the invention, the clutch member 65, Fig. 1, is moved by handle 66 out of engagement with the clutch member 120, thereby releasing the shaft 58 from the motor 116. The clutch member 62 is thrown into engagement with the clutch member 64 by means of the handle 63, and thereupon the shaft 58 is under the control of the steering wheel 70 already described. By turning the wheel 70 to starboard or to port, the shaft 58 is turned in a corresponding direction and the movement of the parts are such as heretofore described with reference to the control of the vessel from the transmitting station.

Having now described one type of system and mechanism embodying my invention, namely, that shown in Fig. 1, with certain details thereof in Figs. 2, 3 and 4, I will now describe a second type of system and mechanism embodying my invention, namely, that shown in Fig. 5 with certain details thereof in Fig. 7.

In Fig. 5, I have represented the rudder 1 and the means directly connected therewith and including the parts 2 to 16 inclusive precisely as in Fig. 1 and have given them the same reference characters. They need not therefore be more particularly described. I have indicated at 17' the shaft to which power is directly applied for turning the rudder 1, this shaft corresponding to the shaft 17 in Fig. 1. The said shaft is driven by a gear 18' fast thereon meshing with and driven by a pinion 19' corresponding to the pinion 19' in Fig. 1. The pinion 19' is fast upon a shaft 280. This shaft corresponds with the crank shaft 20' which in that type of my invention shown in Fig. 1 is driven by steam power. In the type of my invention shown in Fig. 5, I provide electrical means for driving the shaft 280 and have therein represented one convenient form thereof.

Therein the shaft 280 pertains to and is driven by electric motor 281. The motor 281 is adapted to be driven in either direction and to be controlled through radiant energy in accordance with my invention and in this form of my invention from a commutator to be hereinafter referred to or through a gyroscope or other suitable direction-maintaining means also hereinafter more fully described.

While any suitable means may be provided to reverse the direction of rotation of the electric motor 281, I have here shown the following means. Extending from the field connections of said motor 281 are the conductors 282, 283 and the battery 284 extends across the field thereof. The conductors 282, 283 lead to terminals 285, 286 mounted upon the lever 287 pivoted at 288 upon a bracket 289 of the contactor magnet 290. When the contactor magnet is energized, the lever arm 287 acting as an armature brings the terminals 285, 286 into contact with the terminals 291, 292 of the conductors 293, 294 leading to the armature connections 295, 296 respectively of the electric motor 281. Leading from the conductors 282, 283 are wires 297, 298 upon a lever or armature 299 pivoted at 300 upon a bracket 301 upon the contactor magnet 302. When said magnet is energized, the armature or lever 299 is moved downwardly carrying the terminals 303, 304 into contact with the terminals 305, 306 of the conductors 307, 308, the former leading to the armature connection 296 and the latter to the armature connection 295 of the electric motor 281.

When the contactor magnets 290 and 302 are respectively de-energized, the armature levers 287, 299 are lifted into the position shown by the action of the springs 309, 310.

I will now describe the electrical connections from the contactor magnets 290 and 302 to the azimuth ring of the gyroscope or other direction-maintaining means, and will at a subsequent point in the description refer more particularly to the details of the gyroscope and the driving connections associated therewith, which are shown in detail in Fig. 7.

The said azimuth ring is indicated in Fig. 5 at 311. Leading from the contactor magnet 290 is the conductor 312 which extends to the terminal 313 contacting with the contact segment 314 of the azimuth ring, said segment being carried thereby but insulated therefrom. Said azimuth ring 311 also has the contact segment 315, said two segments being insulated from each other by the insulations 316, 317. Also leading from the said contactor magnet 290 is the conductor 318 leading through the battery 319 from which extends the conductor 320. Said conductor is provided with a hand switch 321 which may be moved to the left, viewing Fig. 5, when viewing the sheet from the bottom, so as to bring the parts under the control of the transmitting signal, or to the right, viewing said figure, to bring the parts under manual control. Assuming that the switch 321 has been moved to the left viewing said figure, as described, contact is made thereby with a terminal 322 of a conductor 323 which leads to a terminal 324 adapted to contact with the insulation 317 when the vessel is upon its course.

Leading from the contactor magnet 302 is a conductor 325 which leads to the terminal 326 contacting with the conductor segment 315 of the azimuth ring 311. Also leading from the contactor magnet 302 is a conductor 327 which meets conductor 318 and thence leads to the battery 319 and thence through the switch 321 and conductor 323 to the terminal 324.

I have referred to the fact that the switch 321 may be moved so as to place the parts under hand control. The hand control in this type of my invention is secured through the shaft 328 corresponding generally to the shaft 58 of Fig. 1. Upon said shaft which is mounted in suitable bearings 329, 330, 331, 332 is a drum 333 about which is passed a cable 334 leading about suitable guides to a drum 335 upon a shaft 336 mounted in bearings 337, 338 upon any suitable part of the vessel and having thereon a hand steering wheel 339. In this or in any other suitable manner, the shaft 328 may at the desired time be turned manually.

The shaft 328 is provided with a right hand thread 340 and mounted upon said threaded portion is a nut 341 corresponding generally to the nut 56 of that type of my invention shown in Fig. 1. Said nut carries two contact strips 342, 343 insulated from each other at 344. Leading from the contact strip 342 is a conductor 345 which is connected to conductor 325 leading to the contactor magnet 302. Leading from the contact strip 343 is a conductor 346 connected to wire 312 and therefore leading through the same to the contactor magnet 290.

The shaft 17′ is provided with a right hand threaded portion 347 upon which is mounted a nut 348 corresponding generally to the nut 51 in that form of my invention shown in Fig. 1, and provided with a contact point 349 which is adapted to be moved in the rotation of the shaft 17′ along the contact strips 342, 343, and to complete a circuit through either of them or to engage with the insulation 344. From said contact point 349 leads a conductor 350 which extends to the terminal 351 with which the hand switch 321 may be brought into contact so as to establish a circuit at the proper time to the described connections.

In this form of my invention, as well as in the form of my invention shown in Fig. 1, I preferably provide means whereby the azimuth ring 311 of the gyroscope is moved in the direction of the movement of the gyroscope arm with relation to the vessel so as thereby to bring the insulation 317 of said azimuth ring into engagement with the terminal 324 of the said gyroscope arm. For this purpose I have mounted upon the shaft 17′ a right hand worm 352 which meshes with a worm wheel 353, shown most clearly in Fig. 7. The rotation of the shaft 17′ in either direction imparts a corresponding movement of rotation to the azimuth ring 311 to move the same as described.

I will now describe with more particularity than heretofore the means represented in connection with this type of my invention for effecting movement of the gyroscope arm 354 (Figs. 5 and 7), and whereon the terminal or contact 324 is mounted.

The gyroscope is indicated generally at 355, it being driven in any suitable manner not herein illustrated. It is mounted in suitable gimbal rings 356, 357, the latter having a bearing 358 in the frame 359 positioned upon any suitable part of the vessel. Leading upwardly from the gimbal ring 357 is a vertical shaft 360 having a suitable bearing in the frame 359. In this form of my invention I employ a differential between and operatively connecting the shaft 360 of the gyroscope and the contact arm 354 thereof so as to change the relative position of the contact arm with respect to the gyroscope. To this end, there is fast upon the shaft 360 a bevelled gear 361 in mesh with two beveled pinions 362, 363, at opposite sides thereof. The said pinions are loose respectively upon shafts 364, 365 supporting a bearing block 366 through which passes the shaft 360 of the gyroscope and which shaft is supported at its upper end in a suitable bearing in a cross member 367 of the frame 359. Said shafts 364, 365 are carried by an annular ring 368 suitably supported by ball bearings 369 in the frame 359. Upon the periphery of the ring 368 is cut or provided a worm wheel 370 meshing with and driven by a worm 371 shown also in Fig. 5 and carried by and fast upon a shaft 372.

In mesh with the pinions 362 and 363 of the differential is a gear 373 which has a bearing upon but is loose upon the shaft 360. The said gear 373 carries the contact arm 354 of the gyroscope.

I provide means in this embodiment of my invention, and the action of which will be more fully described hereinafter, whereby the contact arm 354 of the gyroscope 355 may be offset at any desired angle with respect to the gyroscope, so that through connections to be described the course of the vessel will be correspondingly changed. Such offsetting of the contact arm 354 is effected from the transmitting station as will be hereinafter more fully set forth, by bringing into action certain parts whereby the shaft 372 carrying the worm 371 is rotated in one direction or the other and for a predetermined or known length of time, so as to offset the contact arm 354 to a predetermined or known angle.

While any suitable means may be provided to effect this result, I have in Fig. 5 diagrammatically indicated at 374 driving means such as clockwork or a suitable motor effecting movement continuously at a fixed speed. Said driving means 374 is provided with suitable shafting supporting respectively sprocket wheels 375, 376 that are driven in opposite directions thereby. About said sprocket wheel pass sprocket chains 377, 378 also passing about drums 379, 380 having sprocket gears thereon so as to effect the driving of the shaft 372 without slippage and in either direction. The drums 379, 380 are normally loose upon the shaft 372, but are adapted respectively to be clutched thereto in any suitable manner, as by means of clutch cones 381, 382 carried by members 383, 384 having annular grooves wherein take the pins upon arms 385, 386 of three armed levers pivoted respectively at 387, 388, upon brackets 389, 390 of relay magnets 391, 392. Springs 393, 394 are provided to move said three armed levers into the position shown when the respective relay magnets are de-energized. The clutch members 381, 382 are mounted for longitudinal movement upon the shaft 372 but do not turn relatively thereto. Each of the three armed levers has as a part thereof an armature arm 395, 396 respectively, whereby when the relay magnets 391, 392 respectively are energized, either drum 379, 380 is thereby clutched to the shaft 372. Thus through the described connections the shaft 372 is driven in the desired direction at a fixed speed and for a length of time that is determined by the period during which either drum 379, 380 remains clutched to said shaft.

Leading from the relay magnet 391 is a conductor 397 extending to the brush 398 at the commutator 399. Also leading from said relay magnet 391 is a conductor 400 extending to the battery 401 and thence to the brush 402 at the commutator 399. Leading from the relay magnet 392 is a conductor 403 also leading through the battery 401 and thence to the brush 402. Also extending from the relay magnet 392 is a conductor 404 extending to the brush 405 at the commutator 399.

The commutator 399 in the illustrated form of my invention in Fig. 5 has thereon a contact band or strip 406 from which laterally extends at one side the contact piece 407 and from which laterally extends from the other side and at a point 180° removed from the contact piece 407, the contact piece 408. The said contact pieces 407, 408 are adapted, as hereinafter more fully described, to make contact with the brushes 405, 398.

The commutator 399 is moved in a step-by-step manner into four positions, corresponding generally to the four positions of the commutator 102 shown in Figs. 1 and 3. In order to impart such step-by-step movement to the commutator I provide any suitable means which may be and preferably are substantially the same as those illustrated in Fig. 4, and which therefore need not be described with particularity. The gear loose upon the armature shaft is indicated at 409, the ratchet fast on said shaft at 410 and the pawl upon said gear at 411. In toothed relation with said gear 409 is the core 412 of the solenoid 413. Extending from said solenoid is a conductor 414 leading through a battery 415 to a terminal 416. Also leading from said solenoid is a conductor 417 extending to a terminal 418 upon an armature lever 419 pivoted at 420 upon the bracket 421 of a relay magnet 202 corresponding to the relay magnet 202 in Fig. 1 and adapted to be energized in the same manner. A spring 423 is provided to move the armature 419 into the position shown when the relay magnet 202 is de-energized.

From the relay magnet 202 extend conductors 244, 245 which are connected, in a manner which need not be described again with particularity, to the receiving system shown in said Fig. 5, and which is preferably the same as that shown in Fig. 1. I have given the same reference numerals to the corresponding parts of the said receiving system in both Figs. 1 and 5 and the description of the operation with respect to the system shown in Fig. 1 equally applies to that shown in Fig. 5.

Before proceeding to describe the operation of that type of system represented in Fig. 5 with details thereof in Fig. 7, I will describe a type or form of transmitting system that may and preferably is employed in connection with and for the transmission of radiant energy to the receiving systems shown in Figs. 1, 5 and 9.

The transmitting system illustrated in Fig. 6 corresponds generally to that illustrated in Fig. 2 of my co-pending application Serial No. 155,500, but with certain preferred changes to which I will refer.

In said Fig. 6, I have indicated the antenna at 424, through which waves of radio frequency are transmitted to be received by the receiving station. In the system containing the said antenna 424 I provide a suitable source of power 425 whereat are brushes 426, 427 from which lead respectively conductors 428, 429 provided with choke coils 430, 431. In the circuit including the conductors 428, 429 is the condenser 432, the gap 433 and the inductance 434 co-acting with the inductance coil 435 of the antenna 424. Bridge across the conductors 428, 429 is the variable condenser 436, the inductance coil 437 and the variable condenser 438.

Across the condenser 438 is a key the members whereof are indicated at 441, 442, leading from which respectively are conductors 443, 444. The conductor 443 also leads to a contact segment 445 and the conductor 444 also leads to a contact arm 446.

I have provided means associated with the key 441, 442 by means of which a second impulse is sent at a predetermined time after the sending of a first impulse, that is, after the closing of the key 441, 442. While for this purpose any suitable means may be provided, I have in Figs. 6 and 8 shown the following construction.

A shaft 447, whereon is fast the arm 446, is mounted in suitable bearings in a frame 448. Said shaft 447 has a sliding sleeve 449 suitably keyed or otherwise connected thereto so as to rotate therewith, said sliding sleeve 449 having a handle 450 which, when the shaft is to be rotated, is depressed so as to bring the arm 446 beneath the plane of the contact segment 445. The spring 451 is provided to elevate the sliding sleeve 449 to its normal position.

Connected to said shaft 447 is a spring 452 and also connected thereto is a ratchet wheel 453 with the teeth whereof is adapted to engage a pawl 454 pivoted at 455 upon the frame 448. The pawl 454 is provided with a knob or handle 456 so that it may be pressed upon and desirably simultaneously with the actuation of the key 441, 442. A spring 457 is employed to hold the pawl 454 in engagement with the teeth of the ratchet 453. Upon the pawl 454 is pivoted a dog 458 that may engage a projection 459 upon the frame 448 so as when engaged therewith to hold the pawl 454 out of engagement with the teeth of the ratchet. The spring 460 is employed to hold the dog in engagement with the said projection.

Upon the shaft 447 is fast a gear 461 of a suitable train of gearing indicated in Fig. 8 and having associated therewith some suitable governing means 462 so as to insure the unwinding of the spring 452 at a fixed rate. Fast upon the sleeve 449 is a suitable pointer 463 adapted to co-operate with a suitable dial 464 carried by the frame 448 the pointer 463, if desired, being normally elevated slightly above the dial so that when the sleeve is depressed the pointer is brought into indicating relation therewith.

The time interval that is to elapse between the sending of the first and second impulses above referred to having been determined, the dial pointer 463 is turned in a clockwise direction viewing Fig. 6, so as to bring the same to a numeral upon the dial indicating the number of degrees from zero that the contact arm 354 of the gyroscope is to be offset from the gyroscope as heretofore described. The pointer 463 having been turned as stated, it is held in the set position by means of the pawl 454.

Having now described the system represented in Fig. 5 as well as a form of transmitting system that may be associated therewith, I will now describe the operation of the system shown in said figure.

In said Fig. 5, the commutator 399 is represented as in a neutral position which may be either position No. II or position No. IV. For the purposes of this description, it is assumed that the parts are in No. II position, the gyroscope 355 controlling the vessel.

So long as the gyroscope controls the vessel and the latter remains upon its course, the terminal 324 remains upon the insulation 317 of the azimuth ring 311.

The terminals 326, 313 remain in contact at all times with the contact strips or segments 315, 314 of the azimuth ring 311, which is moved in one direction or the other as will be more fully described hereinafter. We will now assume that the vessel is thrown off its course by waves, wind or tide or other natural agency to starboard. When the boat swings to starboard the gyroscope, remaining fixed in space, rotates with respect to the boat in a contra-clockwise direction viewing Fig. 5. Through the action of the differential 361, 362, 363, 373, the arm 354 of the gyroscope is moved in the opposite direction, that is, in a clockwise direction through the same angle with respect to the boat that the boat is thrown off its course, but with respect to the gyroscope the said arm 354 is moved through twice the angle that the boat is thrown off its course.

The described movement of the contact arm 354 brings the contact point 324 of said arm onto the contact segment 314 of the azimuth ring 311 and through the contact 313, the contactor magnet 290 is energized so as through the connections already described to rotate the electric motor 281 in such a direction as to rotate the shaft 17' in a contraclockwise direction and thereby to swing the rudder 1 to port.

In said Fig. 5, I have as already described provided helm angle limiting means and in the operation thereof, and in a manner similar to that described with respect to the system shown in Fig. 1, the shaft 17' in its rotation in a contraclockwise direction, acts through the worm 352 to rotate the azimuth ring 311 so as to bring the insulation 317 thereof into engagement with the contact point 324 of the contact arm 354. Thus the insulation upon the azimuth ring effects the breaking of the circuit established through the contactor magnet 290 and therefore stops the motor 281. This stops the rudder 1 and holds it in a position to port. The rudder being now at port, it acts to bring the vessel back upon the course determined by the gyroscope 355 in a manner similar to that described with respect to the system shown in Fig. 1.

If the vessel should be thrown off its course to port, it will be brought back upon the course determined by the gyroscope in a similar manner through the energization of the contactor magnet 302, serving to drive the electric motor 281 in the opposite direction and thereby to turn the shaft 17' in a clockwise direction and to turn the rudder 1 to starboard.

Having now described the action of the various parts when the commutator 399 is in position No. II, it will be assumed that an impulse is sent from the transmitting station represented in Fig. 6 and that thereby the relay magnet 202 is energized.

By means of the transmitting system or station indicated in Fig. 6, waves of radio or A frequency are being constantly transmitted from the antenna 424, said waves being produced by the radio or A frequency circuit including the condenser 432, the gap 433 and the primary 434 of the transformer 434, 435. Said waves of radio or A frequency are suitably modified into wave trains by means of the condensers 436, 438 and the inductance 437, known as of B frequency. Both said sets of waves are constantly radiated from the antenna 424 and are received by the antenna 230 of the receiving circuit, shown in Figs. 1, 5 and 9. The grid circuit 232 is tuned to waves of the radio or A frequency, and by means of the vacuum tube 233 produce in the plate circuit 234 pulsations of the B frequency, and these by means of the transformer 235 set up pulsations in the grid circuit 236 of the vacuum tube 239.

When the key 441, 442 at the transmitting station is open, the B frequency will be the same as that produced by the alternator 238 and therefore no beats will be produced in the grid circuit 236 of the vacuum tube 239. When the key 441, 442 is closed, thus short-circuiting the condenser 438, the B frequency is changed so that it differs from the frequency of the alternator 238 by a given amount, say 1000 cycles per second. This produces beats in the grid circuit 236 of the vacuum tube 239, thus producing oscillations in the plate circuit 240 which operate on the transformer 241 to trigger off through the mercury tube 242 and thereby through the conductors 244, 245 to energize the relay magnet 202 by means of energy from the generator 243.

The energization of the relay magnet 202 acts through the solenoid 413 to turn the commutator 399 into position No. III.

The turning of the commutator 399 into the said third position brings the contact strip 408 thereof into contact with the brush 398 so as through the brushes 398 and 402 to close the circuit through the relay magnet 391, thus clutching the drum 379 to the shaft 372 and thereby rotating said shaft at a constant rate of speed in a manner already described.

The shaft 372 thereby rotates the worm 371 so as to turn the annular ring 368 in a clockwise direction. The turning of the ring 368 in the described clockwise direction operates through the differential to turn the gear 373 thereof, thereby turning the contact arm 354 of the gyroscope in a clockwise direction at twice the speed at which the annular ring 368 is turned. The described turning of the contact arm 354 effects contact of the terminal or contact point 324 with the contact segment 314 of the azimuth ring 311. This, through the terminal 313 and the described conductors, effects the energization of the contactor magnet 290 so as to rotate the electric motor 281 in such a direction as to turn the shaft 17' in a contraclockwise direction and thereby to turn the rudder 1 to port, thus turning the vessel to port.

The period of time during which the vessel is permitted to continue to port is determined by the time that elapses between the sending of the first and the second signals through the closing respectively of the key 441, 442 and the establishment of a circuit through the contact segment 445 and the arm 446.

Referring now to the transmitting system shown in Fig. 6, a construction has been described whereby the pointer 463 is set a number of degrees from zero, such pointer to be released by disengaging the pawl 454 from the ratchet 453. The operation at the transmitting station at the same time that he closes the key 441, 442 to bring the commutator 399 into position No. III also presses upon the key or handle 456 of the pawl 454 so as to release the ratchet 453. Thereupon the spring 452 is permitted to unwind at a fixed rate and the pointer 463 is moved back through the predetermined number of degrees to zero. Thereby the arm 446 upon the shaft 447 is brought into contact with the contact segment 445, thereby closing the circuit across the key 441, 442 and effecting the sending of a second impulse which acting through the relay magnet 202 energizes the solenoid 413, thereby turning the commutator 399 into position No. IV. The turning of the commutator 399 into position No. IV de-energizes the relay magnet 391 and thereby stops the rotation of the shaft 372 which it will be understood from the foregoing has continued to turn for a predetermined period of time, and hence through a number of revolutions which effect the turning of the annular ring 368 through one half the number of degrees through which the pointer 463 has been set from zero. The described turning of the ring 368 has effected the turning of the contact arm 354 of the gyroscope with respect to the gyroscope through the same number of degrees that the pointer 463 was set from zero. The described offsetting of the contact arm 354 with respect to the gyroscope 355 will effect the turning of the vessel through the same number of degrees that the said contract arm has been offset but in the opposite direction. The vessel will now be held upon this new course by the gyroscope 355, the contact point 325 being on the insulation 317 of the azimuth ring 311. If now the vessel is thrown off its course through any agency, as previously described, it will be brought back to the new course determined by the gyroscope in a manner which has already been fully described and need not be repeated.

The parts of the system being now in position No. IV and the vessel being upon the new course determined by the gyroscope, and differing by a known number of degrees from the previous course as already described, if now it be desired to bring the vessel onto still another course differing by say sixty degrees to starboard from the course upon which the vessel is while the parts are in position No. IV, the dial pointer 463 will be set sixty degrees from zero in a manner already described. Thereupon the operator at the transmitting station will close the key 441, 442 and at the same time will release the pawl 454. A first impulse will therefore be sent through the described closing of the key 441, 442 and in a manner already described the solenoid 413 will be energized, thus turning the commutator 399 to position No. I. This brings the contact strip 407 of the commutator into engagement with the brushes 402, 405, thereby energizing the relay magnet 392 and effecting the rotation of the shaft 372 through the drum 380 and hence in an opposite direction from that previously described. The shaft 372 will now be driven through a predetermined number of revolutions continuing until the dial pointer 463 has returned to zero, thus effecting the sending of a second signal. The ring 368 being turned as previously described, in this particular case through thirty degrees, in a contraclockwise direction. This causes the boat to be turned through sixty degrees to starboard. The sending of the second impulse results in the turning of the commutator 399 into the position No. II, thereby holding the boat on its new course as already described. This completes one cycle of operation of the system represented in Fig. 5.

When it is desired to steer the vessel by hand the switch 321 is turned to contact with the terminal 351, thereby cutting out those parts of the system whereby the vessel is turned through the transmission of radiant energy. In such condition of the parts, the hand wheel 339 is turned in the desired direction thereby rotating the shaft 328 in the desired direction, so as to move the nut 341 in one direction or the other, thus bringing the contact point 349 of the nut 348 onto one or the other contact strip 342, 343. Thereupon the circuit is completed through either the contactor magnet 290 or the contactor magnet 302, thereby rotating the electric motor 281 in the proper direction. Thus in the manner already described, the shaft 17' is turned in the proper direction to swing the rudder 1 to starboard or to port as may be desired and in a manner not necessary more fully to describe.

In Fig. 9, I have represented still another type of system embodying my invention, and in Figs. 10, 11 and 12 have represented certain details of parts pertaining thereto.

In that type of my invention represented in Fig. 9 I provide means whereby an arm pertaining to the azimuth ring of the gyroscope is turned through a predetermined number of degrees to starboard or to port, with respect to the boat, and provide means whereby the arm having been so turned with respect to the boat, the rudder being correspondingly turned, the rudder is maintained at the angle to which it has been turned, for any desired length of time. Thereupon such condition is terminated through the sending of another impulse which places the vessel under the control of the gyroscope.

In carrying out my invention I preferably provide two azimuth rings which may be regarded as a single ring physically separated for mechanical reasons but operatively connected, each of said azimuth rings having a contact arm pertaining thereto, one being operatively connected with the gyroscope as will be hereinafter more fully described. I provide for the control of the various parts through a commutator which, as will be hereinafter more fully described, has six positions, instead of four positions in those types of my invention shown in Figs. 1 and 5. Referring more particularly to Fig. 9, the rudder 1 is represented as in Figs. 1 and 5. The parts 2 to 16 inclusive in Fig. 9 are the same as the corresponding parts in Figs. 1 and 5, and need not be more particularly described. Operatively connected to the rudder 1 is a shaft 17 corresponding to the shaft 17 in Fig. 1. This shaft is driven through gearing from an electric motor in the manner described with respect to Fig. 5 and the said electric motor is rotated in one direction or the other through contactor magnets that are energized in a manner similar to those described with respect to Fig. 5. Therefore I have given in Fig. 9 the same numerals to the parts corresponding to parts 18', 19' and 280 to 310 inclusive, which I need not therefore more particularly refer to in the detained description of the system shown in Fig. 9.

Referring now to Fig. 10, I have there indicated two azimuth rings mechanically connected, the upper ring being represented at 465 and the lower ring at 92', the latter corresponding in function to the ring 92 in Fig. 2. These rings are essentially the same in construction as the azimuth ring 92 in Fig. 1. In said Fig. 10, I have indicated the gyroscope and inasmuch as the same may be and preferably is the same as that shown in Fig. 2, I have given it the same numeral 71 and the parts numbered 72 to 90 inclusive in Fig. 2 are shown also in Fig. 10, and I have there given them the same numerals and will not here redescribe them.

The parts numbered 91 and 93 to 96 inclusive in Fig. 2 are preferably employed also in that form of my invention shown in Fig. 10 and are there given the same numerals, and hence need not be more particularly referred to.

I have stated that I employ in this type of my invention a second azimuth ring mechanically connected to the azimuth ring 92'. Said second azimuth ring 465 is rigidly mounted upon the upper face of the worm wheel 95 that is driven by the shaft 17 in a manner not necessary more particularly to describe. Upon said azimuth ring 465 are two contact segments 466 and 467 shown most clearly in Fig. 9 and separated by insulation 468 and 469. Adapted to engage with said contact segments 466, 467 are contacts 470 and 471 shown also in Fig. 9, which are connected in parallel by conductors 472, 473 with the contacts 93, 94 of the lower azimuth ring 92'.

Leading from the conductor 472 is a conductor 474 which as shown in Fig. 9 leads to the port contactor magnet 290. Connected to the conductor 473 is a conductor 475 which leads to the starboard contactor magnet 302. Leading from the contactor magnet 290 is a conductor 476 extending to battery 477 and thence to the hand switch 478 which is adapted to be moved into contact with the terminal 351 of the hand control to be hereinafter more fully referred to or into contact with the terminal 480 of the control from the distant transmitter shown in Fig. 6. Said terminal 351 is the same as the correspondingly numbered part in Fig. 5. Leading from the starboard contactor magnet 302 is a conductor 481 which extends to the battery 477.

In order manually to control the vessel I preferably employ the same construction of parts already particularly described with reference to Fig. 5, and therefore the parts numbered 328 to 350 inclusive in Fig. 5 are given the same reference numerals in Fig. 9 and hence need not here be more specifically referred to.

Returning again to the upper or second azimuth ring 465, the contact arm pertaining thereto is indicated in dotted lines at 481' in Fig. 9. Said arm carries a contact point 482 which is adapted to engage either the insulation 469 or the contact segments 466, 467 in the operation of the parts as will be more particularly hereinafter referred to. The said contact arm 481 is provided with two sufficiently strong springs 483, 484, the function whereof is to return said arm to central position with respect to the frame 75 at the proper time. Said springs are sufficiently strong to rotate backward a motor to be hereinafter referred to. Rigid with the contact arm 481 is the gear wheel 485 meshing with the pinion 486 upon a shaft 487 having fast thereon a gear 488 meshing with a pinion 489 upon the shaft 490 of the motor 491 above referred to and which is run at a constant speed in any suitable manner irrespective of the strain to which said motor subjects the springs 483, 484 when functioning.

Referring again to the terminal 480 shown in Fig. 9, leading therefrom is a conductor 492 extending to the brush 493 at the commutator 494. Leading from the terminal or contact 482 upon the upper contact arm 481 is a conductor 495 which extends to the brush 496 at the commutator 494 and leading from the contact or terminal 497 (shown in dotted lines in Fig. 10) of the contact arm 89 of the lower azimuth ring 92' is a conductor 498 extending to the brush 499 at the commutator 494.

The motor 491 is adapted to be driven in either direction through any suitable means and preferably through the agency of contactor magnets. Such means I will now particularly refer to. The field terminals of the motor 491 are connected to the conductors 500, 501 leading from said motor 499 and across the field of which is the battery 502, said conductors extending respectively to the terminals 503, 504 upon an armature lever 505 pivoted at 506 upon a bracket 507 of the contactor magnet 508, a spring 509 being employed to return the armature lever 505 to the position shown when the magnet is de-energized. Leading from the conductor 501 is a wire 510 having a terminal 511 upon the armature lever 512 and leading from the conductor 500 is a wire 513 having a terminal 514 upon said armature. The latter is pivoted at 515 upon a bracket 516 upon the contactor magnet 517, a spring 518 being employed to return the armature lever 512 to the position shown when the contactor magnet 517 is de-energized. Leading from the armature terminals of the motor 491 are two conductors 519, 520 having respectively terminals 521 and 522 with which the terminals 514, 511 are brought into contact when the contactor magnet 517 is energized. Also leading from the conductors 519, 520 are conductors 523, 524 having terminals 525, 526 with which the terminals 504, 503 contact when the contactor magnet 508 is energized.

Leading from the contactor magnet 508 is a conductor 527 leading to the brush 528 at the commutator 494 and also leading from said contactor magnet 508 is a common wire 529 leading to the battery 530. Leading from the contactor magnet 517 is a conductor 531 extending to the wire 529 and thence communicating with the battery 530. Leading from the battery 530 is a conductor 532 which extends to the brush 533 at the commutator 494. Also leading from the contactor magnet 517 is a conductor 534 which leads to the brush 535 at the commutator 494.

Referring again to the gyroscope 71 and the control of the clutch thereof, from the solenoid 86 thereof lead the two conductors 536, 537, the former extending to the brush 538 at the commutator 494 and the latter extending to the battery 530.

Referring now to the commutator 494, I have in Fig. 11 indicated a development thereof and in Fig. 12 have indicated one form of means for imparting a step-by-step movement thereto.

The shaft of said commutator is indicated at 539 in Fig. 12, and thereon is fast a ratchet 540 provided with six teeth and which are adapted to be engaged by a pawl 541 held in position by a spring 542 and pivotally mounted upon a gear wheel 543 loose upon the shaft of the commutator and having meshing relation with the teeth 544 on the core 545 of the solenoid 546 corresponding to the solenoid 192 of Fig. 1. Said solenoid is adapted to be energized in a manner already described and inasmuch as in Fig. 9, I have represented the same construction of parts for energizing the same as are indicated in Fig. 1 by numerals 202 to 212 inclusive, I have in Fig. 9 given the same parts the same reference numerals.

The relay magnet 202 for energizing the solenoid 192 is adapted to be energized by the receiving system shown in said Fig. 9 and which is the same as that shown in Fig. 1 and described with respect to the parts 230 to 245 inclusive. Therefore in Fig. 9, I have given the same parts the same reference numerals and they need not be herein again described.

Referring again to the commutator 494 and to the development thereof in Fig. 11, the same is therein represented as having two contact strips or segments 546, 547, the former having the projections 548, 549 extending to the left in said figure and the projections 550, 551 extending to the right in said figure, and the latter having projections 552, 553, 554 extending to the right in said figure and a single projection 555 extending to the left in said figure.

The commutator is provided with a contact piece 556 which is connected with the contact strip 547 by means of a wire 557 extending under the surface insulation of the commutator as referred to in connection with the commutator shown in Fig. 1.

Adjacent to Fig. 11, I have indicated by proper numerals the six positions of the said commutator.

In Fig. 9, the commutator 494 is in what I term position No. II of the commutator as indicated thereon in Fig. 11. This is a so-called neutral position, being one in which the gyroscope is in control of the vessel. I will therefore describe briefly the operation of the parts when in the position shown in Fig. 9 and will then describe the operation in the succeeding positions.

In position No. II the clutch of the gyroscope is closed, the circuit including the solenoid 86 thereof being open, thus clutching the arm 89 to the gyroscope 71.

In the said position No. II of the commutator the gap across the brushes 498, 499 is bridged by the contact piece 551 and the contact segment 546. This establishes a circuit through the conductors 492, 498, the latter leading to the terminal 497 of Fig. 10. This allows the gyroscope through the action of the azimuth ring 92′ and the contactor magnets 290, 302 to control the vessel in a manner which has been made clear in the foregoing description and need not here be repeated.

The circuit to the brush 496 remains open so that the upper arm 481 pertaining to the upper azimuth ring does not function.

The functioning of the parts when the commutator occupies the position No. II having been as stated, it will be assumed that an impulse is sent by closing the key 441, 442 of the transmitting system, Fig. 6, and at the same time and in a manner already described, the pawl 454 is moved so as to cause another impulse to be sent after a predetermined time interval. When the first impulse is received, the commutator is turned into position No. III. In such position the gap between the brushes 533 and 538 is bridged by the contact projection 553 and the contact segment 547. This closes the circuit through the conductors 532, 536 and 537 and the battery 530, thereby energizing the solenoid 86 and releasing the clutch members 77, 78 of the gyroscope 71. The result is to effect the movement of the lower contact arm 89 into a central position through the action of the springs 87, 88. The circuit previously established across the brushes 493, 499 is broken by the turning of the commutator into the position No. III. This therefore breaks the circuit through the said lower arm 89 and the azimuth ring 92′, which therefore remain inoperative. By the turning of the commutator to the position No. III, the circuit is completed across the brushes 493, 496 through the contact segment 546 and the projection 549 thereof, with the result that a circuit is established through the conductors 492, 495 to the upper arm 481 of the upper azimuth ring 465. The said upper arm and the said upper ring thereupon control the rudder 1 of the vessel. The turning of the commutator 494 into the said third position bridges the gap across the brushes 533, 535 through the contact strip 547 and the projection 555 thereof, and a circuit is established through the conductor 534, the contactor magnet 517, the conductors 531, battery 530, the conductor 532, back to the brush 533. This energizes the contactor magnet 517 and closes the circuit through the conductors 519, 520, thereby rotating the motor 491 in the proper direction to cause the arm 481 to move in a contraclockwise direction. The described movement of the arm 481 brings the terminal 482 thereof onto the contact segment 466 of the upper azimuth ring 465, thereby to close the circuit through the terminal 470 and the conductor 474, energizing the port contactor magnet 290. As previously described, the energization of said contactor magnet rotates the motor 281 in such a direction as to rotate the shaft 17 in a contraclockwise direction and thereby turn the rudder 1 relatively to the boat to port. The described rotation of the shaft 17 acting through the worm 96 thereon turns the worm wheel 95 which as previously stated is connected with both the azimuth rings 465 and 92' so as to cause the insulation 469 of the upper azimuth ring to follow after and to overtake the terminal 482 in a manner already described with reference to the other systems of my invention and which need not here be more particularly referred to.

The movement of the contact arm 481 in the contraclockwise direction continues at a constant rate so long as the commutator 494 remains in position No. III, and hence the rudder 1 continues to turn relatively to the boat at a rate proportional to the movement of the arm 481. Such movement of the rudder is therefore at a constant rate.

It has been already stated that at the time the first impulse is sent, thereby turning the commutator from position No. II to position No. III, the pawl 454 was moved so as to cause a second impulse to be sent at the end of a predetermined period determined by the position of the pointer 463 with respect to the zero position of the dial 464 of Fig. 6. Said dial is graduated into degrees which with reference to this type of my invention, I here term degrees of rudder angle.

Therefore, at the end of a predetermined time a second impulse is transmitted and the commutator 494 is thereby turned into the next position, namely, into position No. IV. The turning of the commutator into said position No. IV terminates the turning of the rudder 1 with respect to the vessel and the rudder is now held in the position at which it has arrived. So long as the commutator 494 remains in position No. IV, the boat therefore continues to turn to port with a turning radius which is dependent upon the angle that the rudder has assumed, as already described.

When the commutator 494 is turned into position No. IV, the brushes 533, 538 are still bridged across as previously stated and therefore the solenoid 86 of the gyroscope 71 continues to be energized with the result already described. In such condition the lower arm 89 of the gyroscope remains disconnected and in a central position due to the action of the springs 87, 88. By the turning of the commutator 494 into said position No. IV the circuit through the brushes 493, 496 is broken, thereby breaking the circuit through the upper arm 481 so that the latter ceases to function. This arm is thereupon brought back to central position by the springs 483, 484.

The result of the foregoing is that the rudder 1 remains in the described position to port because the circuits through the port and starboard contactor magnets 290, 302 have been broken at the commutator 494. When the operator at the transmitting station ascertains visually or otherwise that the boat has turned to the desired extent to port, he sends another impulse by closing the key 441, 442, thereby moving the commutator 494 into position No. V, which is the other neutral position and in which the vessel is placed under the control of the gyroscpoe 71, as in position No. II.

When the commutator is turned into position No. V the circuit through the brushes 533, 538 is broken, thereby de-energizing the solenoid 86 of the gyroscope and allowing the clutch members 77, 78 to re-engage and thereby clutching the arm 89 to the gyroscope 71. At the same time and by the turning of the commutator 494 into the said position No. V, the circuit is established between the brushes 493, 499 by means of the contact projection 550 and contact segment 546, thereby closing the circuit to the lower arm 89 of the gyroscope, thus permitting the gyroscope to control the contactor magnets 290, 302 as described with respect to position No. II and thus controlling the rotation of the electric motor 81.

The boat is now on a new course which is held fixed by the gyroscope 71.

When it is desired to release the vessel from the control of the gyroscope 71, the operator at the transmitting station closes the key 441, 442 of Fig. 6 and at the same time moves in a manner already described the pawl 454, so that an impulse is sent turning the commutator 494 into position No. VI and at the end of a predetermined time interval established by the position of the dial pointer 463 another impulse is sent which turns the commutator 494 into position No. I. The turning of the commutator into position No. VI effects the energization of the solenoid 86 of the gyroscope 71, thus releasing the arm 89 from the gyroscope 71 and breaking the circuit through the arm 89 in a manner already described. The turning of the commutator 494 into the said position No. VI establishes a circuit through the brushes 493, 496 and the conductors pertaining thereto, through the arm 481, with the result that the rudder is controlled by the motion of the said arm 481 as described with respect to position No. III. At the same time the contact piece 556 has been brought into register with the brush 528, thereby closing the circuit between the brushes 528 and 533 and energizing the contactor magnet 508. The result of this is to rotate the motor 491 so as to drive the arm 481 in a clockwise direction viewing Fig. 9. As previously described, this causes the rudder 1 to move off at a constant rate to starboard and the extent to which the rudder is turned in such direction is determined by the time interval that elapses between the sending of the impulse that turns the commutator in position No. VII through the closing of the key 441, 442 and the receipt of the next impulse through the closing of the circuit through the contact 445, 446 of Fig. 6. The receipt of the last impulse referred to turns the commutator 494 into position No. I. As previously described this breaks the circuit through both the contact arms 481 and 89 with the result that neither of the contactor magnets 290 and 302 can be energized and the electric motor 281 cannot be rotated in either direction. Thus the rudder 1 is held in its position to starboard in which it has been placed in the manner just above described. The boat therefore continues turning to starboard so long as the commutator 494 remains in position No. I. At the receipt of the next impulse, which turns the commutator 494 into position No. II, the turning of the boat to starboard is terminated, and the vessel is again brought under the control of the gyroscope 71.

This completes a cycle of the operation of the system illustrated in Fig. 9.

I have referred to the turbine engine 153 as provided with valve means for varying the speed of the vessel. Said turbine engine represents the main driving or propelling engine for the vessel, and by entirely closing the valve 155 thereof, the supply of steam is cut off and the vessel is thereby stopped. Within the scope of my invention I may provide means whereby the propelling engine or engines may be reversed through or by the receipt of signals from the transmitting station. Thus, not only may the propelling engine be stopped, but it may be driven in either direction, or a pair of engines may be provided, one to be driven in a forward direction and the other in a reverse direction. Thus not only may the vessel be stopped, but it may be propelled either in a forward or a reverse direction, and this through the transmission of signals from the transmitting station.

I have disclosed in this application several forms of commutator adapted to be turned or moved in a step-by-step manner. Instead of a commutator I may employ a fluid operated valve, such as a rotary valve turned in a step-by-step manner and may so connect the same that it is operated by the receipt of signals transmitted from the receiving station as impulses of radiant energy. For this purpose, I may employ any suitable valve means, such, for example, as that disclosed in my co-pending and earlier filed application Serial No. 816,600, filed February 4, 1914, for system of teledynamic control. I may also employ operating means including a pneumatic valve similar to that shown in my British Patent No. 16,328 of 1914 in lieu of the commutator herein disclosed and provide suitable means for operating the same through the transmission of radiant energy from a distant transmitting station.

I have stated that any suitable transmitting and receiving system may be provided and have represented forms of such systems corresponding generally to those disclosed in my co-pending application Serial No. 155,500. Instead of or preferably in addition to such transmitting and receiving systems involving the use of electromagnetic waves or electrical emanations of radiant energy, I may provide sound detecting means operatively related to a distant transmitting station and connected on the ship to the parts herein disclosed as operated from the distant transmitting station. Preferably the sound detector is connected in parallel with the detector herein illustrated, so that if the antenna herein represented be shot away, the vessel may be controlled through the transmission of sound waves. This is preferably done by sound waves transmitted through the water, and the detector can be and preferably is located below the surface of the water, and in such a place that there is but little danger of the same being shot away. It is to be understood that any well known or suitable sound signalling apparatus may be used for this purpose.

Such apparatus may be and preferably is connected up in parallel with the entire system or apparatus herein disclosed, but if desired I may connect up only certain parts of the apparatus to the sound signalling detector, such, for example, as the means for stopping the engine or other propelling means for the ship. Preferably, however, such sound detector would also be connected up to the means for turning the rudder to starboard and to port.

Having thus described one illustrative embodiment of my invention, I desire it to be understood that although specific terms are employed, they are used in a generic and descriptive sense and not for purposes of limitation, the scope of the invention being set forth in the following claims.

Claims:—

1. A system for the control of moving bodies comprising in combination, a vessel having a rudder, a prime mover to turn said rudder to starboard or to port, means including a commutator to govern the action of said prime mover, and means responsive to radiant energy from a distant control station to move said commutator and including means whereby a second signal is automatically sent at a predetermined time after the sending of the last preceding signal.

2. A system for the control of moving bodies comprising in combination, a vessel, a rudder thereon adapted to be turned to starboard and to port, a shaft operatively connected to said rudder, a prime mover to rotate said shaft in either direction, a gyroscope to maintain said vessel upon its predetermined course, a commutator operatively connected to said gyroscope and to said prime mover, means whereby the commutator is turned in a step-by-step manner to turn the rudder to starboard through said prime mover, next to place the vessel under the control of the gyroscope, next to turn the rudder to port through said prime mover and next to place the vessel under the control of the gyroscope, and means responsive to radiant energy from a distant control station to move said commutator and including means whereby a second signal is sent at a predetermined time automatically after the last preceding signal, whereby the vessel is turned under the influence of its rudder to starboard or to port.

3. A system for the control of moving bodies comprising in combination a movable body, steering means for said body, means responsive to radiant energy from a distant station to operate said steering means, said radiant energy responsive means including means whereby a second signal of radiant energy is automatically sent at a predetermined time after the sending of the last preceding signal.

4. A system for the control of moving bodies comprising in combination, a moving body, a rudder movably mounted on said body, a shaft, means operated by said shaft for shifting said rudder, a prime mover arranged to rotate said shaft in either direction about its axis, means including a gyroscope for actuating said prime mover, means controlled by radiant energy from a distant station for rendering said gyro-means inoperative and for causing said prime mover to actuate said shaft in a predetermined manner, and means automatically operable after a predetermined interval to cause another impulse of radiant energy to actuate said control means to restore said gyro-means to the control of said moving body.

5. A system for the control of moving bodies comprising in combination, a moving body, a rudder movable mounted on said body, a shaft, means operated by said shaft for shifting said rudder, a prime mover arranged to rotate said shaft in either direction about its axis, means including a gyroscope for actuating said prime mover, and means controlled by radiant energy from a distant station for rendering said gyro-means inoperative and for causing said prime mover to actuate said shaft in a predetermined manner, and a time controlled device for causing another impulse of radiant energy to actuate said control means to restore said gyro-means to the control of said moving body.

6. A system for the control of moving bodies comprising in combination, a movable body, steering means for said body, means including a gyroscope for actuating said steering means, a contact arm arranged to operate in conjunction with said gyroscope, means responsive to radiant energy for moving said arm relative to said gyroscope means at an angular velocity different from the angular velocity of the moving body, and means for restoring said arm to its initial position relative to said gyroscope after a predetermined interval.

7. A system for the control of moving bodies comprising in combination, a movable body, steering means for said body, means including a gyroscope for actuating said steering means, a contact arm arranged to operate in conjunction with said gyroscope, means responsive to radiant energy for moving said arm relative to said gyroscope means at an angular velocity greater than the angular velocity of said movable body, and means for restoring said arm to its initial position relative to said gyroscope after a predetermined interval.

8. A system for the control of moving bodies comprising in combination, a movable body, steering means for said body, means including a gyroscope for actuating said steering means, a contact arm arranged to operate in conjunction with said gyroscope, means responsive to radiant energy for moving said arm relative to said gyroscope means at an angular velocity different from the angular velocity of said movable body, and means responsive to a second impulse of radiant energy for restoring said arm to its initial position relative to said gyroscope after a predetermined interval.

9. In a system for the control of movable bodies, a vessel, steering means thereon for varying the direction of movement of the vessel, driving means adapted to vary the position of said steering means, means including a selector switch to govern the action of said driving means and means responsive to radiant energy to move said selector switch including means whereby a second signal is automatically sent after a predetermined interval after the sending of the last preceding signal.

10. In a system of distant control, a movable body, means thereon for varying the direction of movement of the body, driving means adapted to operate said direction varying means, means including a selector switch to control the operation of said driving means in desired directions, and means responsive to radiant energy from a distant control station to adjust said selector switch into desired positions, and including means whereby a second signal is automatically sent after a predetermined interval after the sending of said last preceding signal.

11. A system for the control of moving bodies, comprising in combination a moving body, means for varying the direction of movement of said body, means for variably adjusting the position of said varying means, a shaft for operating said adjusting means, a prime mover arranged to rotate said shaft in either direction about its axis, means including a gyroscope for actuating said prime mover, means controlled by said energy from a distant station for rendering said gyroscope ineffective for controlling said prime mover and for causing said prime mover to actuate said shaft in a desired direction, and automatic means operated after a predetermined interval to produce an additional radiant energy signal for actuating said control means to restore the gyroscope to control further movement of said body.

In testimony whereof, I have signed my name to this specification.

JOHN HAYS HAMMOND, Jr.